(12) United States Patent
Steele

(10) Patent No.: US 12,722,557 B2
(45) Date of Patent: Sep. 1, 2026

(54) VEHICLE AND MOTORCYCLE TOW DOLLY

(71) Applicant: Mark Owen Steele, Elkhart, IN (US)

(72) Inventor: Mark Owen Steele, Elkhart, IN (US)

( * ) Notice: Subject to any disclaimer, the term of this patent is extended or adjusted under 35 U.S.C. 154(b) by 585 days.

(21) Appl. No.: 18/192,897

(22) Filed: Mar. 30, 2023

(65) Prior Publication Data

US 2023/0311739 A1 Oct. 5, 2023

Related U.S. Application Data

(60) Provisional application No. 63/325,376, filed on Mar. 30, 2022.

(51) Int. Cl.
*B60P 3/077* (2006.01)
*B60P 3/079* (2006.01)

(52) U.S. Cl.
CPC ............... *B60P 3/077* (2013.01); *B60P 3/079* (2013.01)

(58) Field of Classification Search
CPC ............ B60P 3/127; B60P 3/077; B60P 3/079
See application file for complete search history.

(56) References Cited

U.S. PATENT DOCUMENTS 5,810,544 A * 9/1998 Wellman ................ B60P 1/025 280/124.128
8,876,140 B2 * 11/2014 Barnett .................. B60P 3/122 280/401
9,321,388 B2 * 4/2016 Barnett .................. B60P 3/122
11,230,215 B2 * 1/2022 Cochet ................. B62D 63/061
2004/0036255 A1 * 2/2004 Orlando ................. B60P 3/127 280/402
2005/0238455 A1 * 10/2005 Toteff ..................... B60P 3/077 410/104

* cited by examiner

*Primary Examiner* — Minnah L Seoh
*Assistant Examiner* — Hosam Shabara
(74) *Attorney, Agent, or Firm* — Indiana University Maurer School of Law

(57) ABSTRACT

A dolly assembly includes a chassis, a plurality of wheels, an automobile wheel support area, and a motorcycle carrier platform.

19 Claims, 5 Drawing Sheets

VEHICLE AND MOTORCYCLE TOW DOLLY

RELATED APPLICATIONS

The present application claims the benefit of U.S. Provisional Application No. 63/325,376, filed Mar. 30, 2022, naming Mark Owen Steele, and titled "Tow Dolly and Motorcycle Carrier," the entire disclosure of which is expressly incorporated by reference herein.

TECHNICAL FIELD

The present disclosure relates to vehicle transportation. More specifically, the present disclosure is directed to a device that is towed behind a motorized vehicle, such as a car/truck, recreational vehicle, etc. that can be utilized to pull another vehicle, such as a car/truck, etc. and a motorcycle.

BACKGROUND AND SUMMARY OF THE DISCLOSURE

The following statements are intended to facilitate an understanding of the present disclosure. The statements are to be read in this light and should not be construed as admissions of prior art.

According to the present disclosure, a dolly provides the function of an automotive tow dolly (in which the automobile is towed with two wheels off the ground) and a motorcycle trailer in one piece of equipment.

According to another aspect of the present disclosure, a dolly, vehicle, and motorcycle assembly is provided including a dolly, vehicle, and motorcycle. The dolly includes a dolly chassis having a front end configured to couple to a tow vehicle and a rear end spaced apart from the front end and a plurality of dolly wheels supporting the dolly chassis. The plurality of dolly wheels cooperate to define a dolly wheel axis of rotation about which the plurality of dolly wheels rotate. The vehicle includes a vehicle chassis, a forward plurality of vehicle wheels supporting the vehicle chassis, a rearward plurality of vehicle wheels supporting the vehicle chassis, a forward vehicle wheel axis of rotation about which the forward plurality of vehicle wheels rotate, and a rearward vehicle wheel axis of rotation about which the rearward plurality of vehicle wheels rotate. The motorcycle includes a motorcycle chassis and a plurality of motorcycle wheels supporting the motorcycle chassis, a forward motorcycle wheel axis of rotation about which a forward motorcycle wheel rotates, and a rearward motorcycle wheel axis of rotation about which a rearward motorcycle wheel rotates. The assembly has a first state with the vehicle being supported by the dolly with the forward vehicle wheel axis of rotation being positioned forward of the dolly wheel axis of rotation, the forward plurality of wheels being stationary relative to the dolly chassis, the rearward plurality of wheels being supported by the ground, the rearward plurality of wheels rotating relative to the chassis, and the motorcycle being spaced apart from the dolly. The assembly has a second state with the motorcycle being supported by the dolly with the forward motorcycle wheel axis of rotation being positioned forward of the dolly wheel axis of rotation, the rearward motorcycle wheel axis of rotation being positioned rearward of the dolly wheel axis of rotation, and the vehicle being spaced apart from the dolly.

According to another aspect of the present disclosure, a dolly and vehicle assembly is provided comprises a dolly and a vehicle. The dolly includes a dolly chassis having a front end configured to couple to a tow vehicle and a rear end spaced apart from the front end and a plurality of dolly wheels supporting the dolly chassis. The plurality of dolly wheels cooperate to define a dolly wheel axis of rotation about which the plurality of dolly wheels rotate. The dolly further includes a motorcycle wheel chock supported by the dolly chassis. The vehicle includes a vehicle chassis and a plurality of vehicle wheels supporting the vehicle chassis. The plurality of vehicle wheels cooperate to define a vehicle wheel axis of rotation about which the plurality of vehicle wheels rotate. The vehicle is supported by the dolly with the vehicle wheel axis of rotation forward of the dolly wheel axis of rotation.

According to another aspect of the present disclosure, a method of towing a towed vehicle and motorcycle with a dolly and tow vehicle is provided. The method comprises the step of providing a tow vehicle, a dolly including a plurality of wheels cooperating to define a dolly wheel axis of rotation, a towed vehicle, and a motorcycle. The method further comprises the steps of coupling a front end of the dolly to the tow vehicle, loading the motorcycle on the dolly, securing the motorcycle to the dolly, towing the motorcycle and dolly with the tow vehicle, unsecuring the motorcycle from the dolly, unloading the motorcycle from the dolly, loading the towed vehicle on the dolly, securing the towed vehicle to the dolly with the first axis of rotation of the towed vehicle wheels positioned forward of the dolly wheel axis of rotation, towing the towed vehicle and dolly with the tow vehicle with a first plurality of towed vehicle wheels supported by the dolly and a second plurality of wheels of the towed supported by the ground, unsecuring the towed vehicle from the dolly, and unloading the towed vehicle from the dolly.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE DRAWINGS

According to the present disclosure, a dolly 100 is provided that facilitates the towing of a motorcycle 17 and/or a towed vehicle 104 by a tow vehicle 106, such as a recreational vehicle or other vehicle suitable for towing. According to the preferred embodiment of the present disclosure, dolly 100 is sized to tow only one of motorcycle 17 or towed vehicle 104 at a time. According to alternative embodiments, dolly 100 may be reconfigured to two both motorcycle 17 and towed vehicle 104. Together, dolly 100, motorcycle 17, and/or towed vehicle 104 may be referred to as various assemblies thereof.

Figure 1:
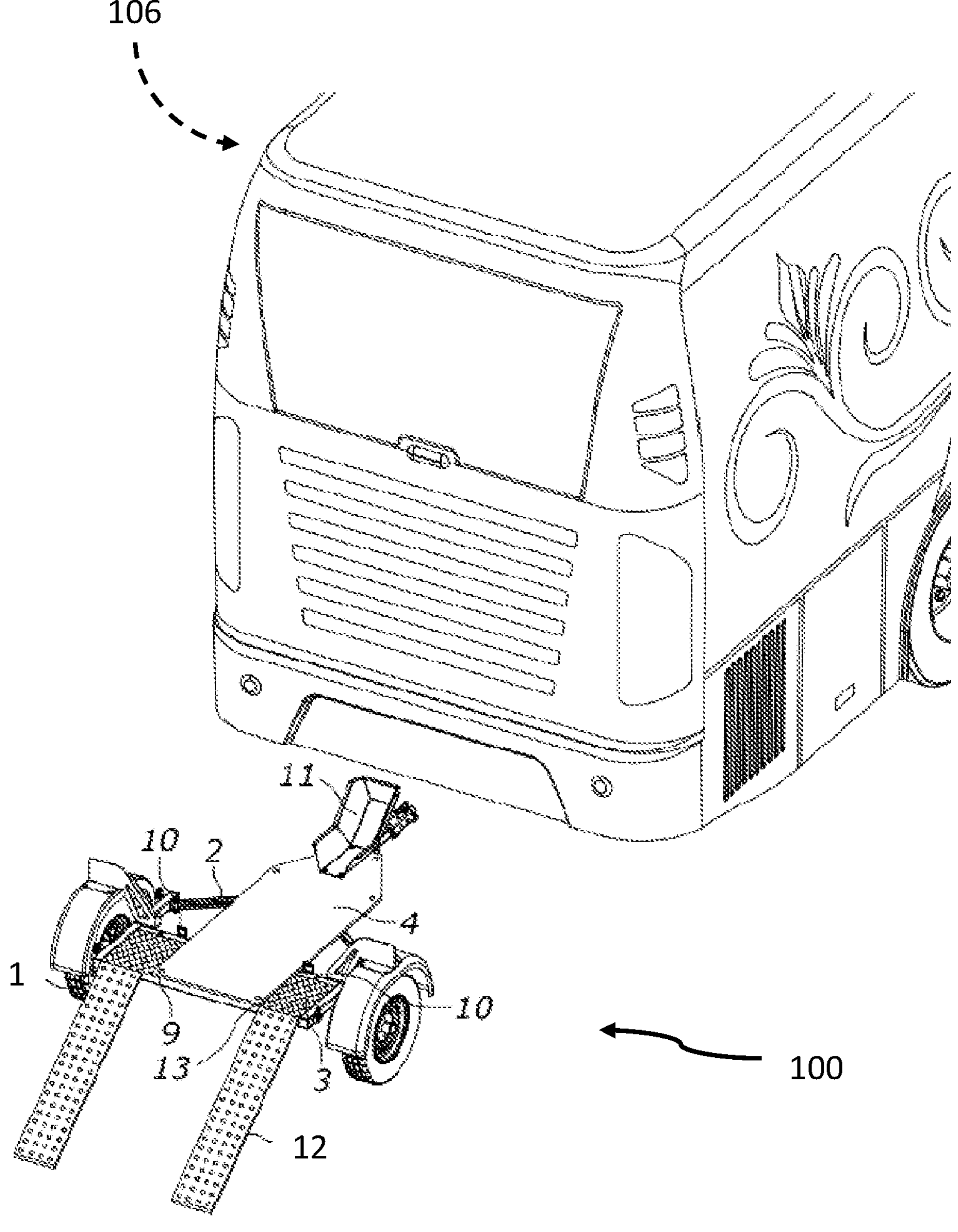
FIG. 1 depicts a perspective view of one example of the improved tow dolly that shows the tow dolly unloaded with the loading ramps mounted.

FIG. 1 depicts a perspective view of one example of dolly 100 that shows dolly 100 unloaded with mounted loading ramps 12. In this preferred embodiment, the load bearing structure of dolly 100 includes two dolly wheels 1, frame/dolly chassis 2 with plates 107 defining automobile/towed vehicle wheel support surfaces/areas 3, motorcycle carrier/platform 4 having tie down locations 9, motorcycle wheel chock 11. Load ramps 12 removably connect to chassis 2 at load ramp attachment areas 13. Chassis 2 is preferably rigidly supported by an axle 108. Dolly wheels 1 rotate about a dolly wheel axis of rotation 110 with or around axle 108.

Figure 2:
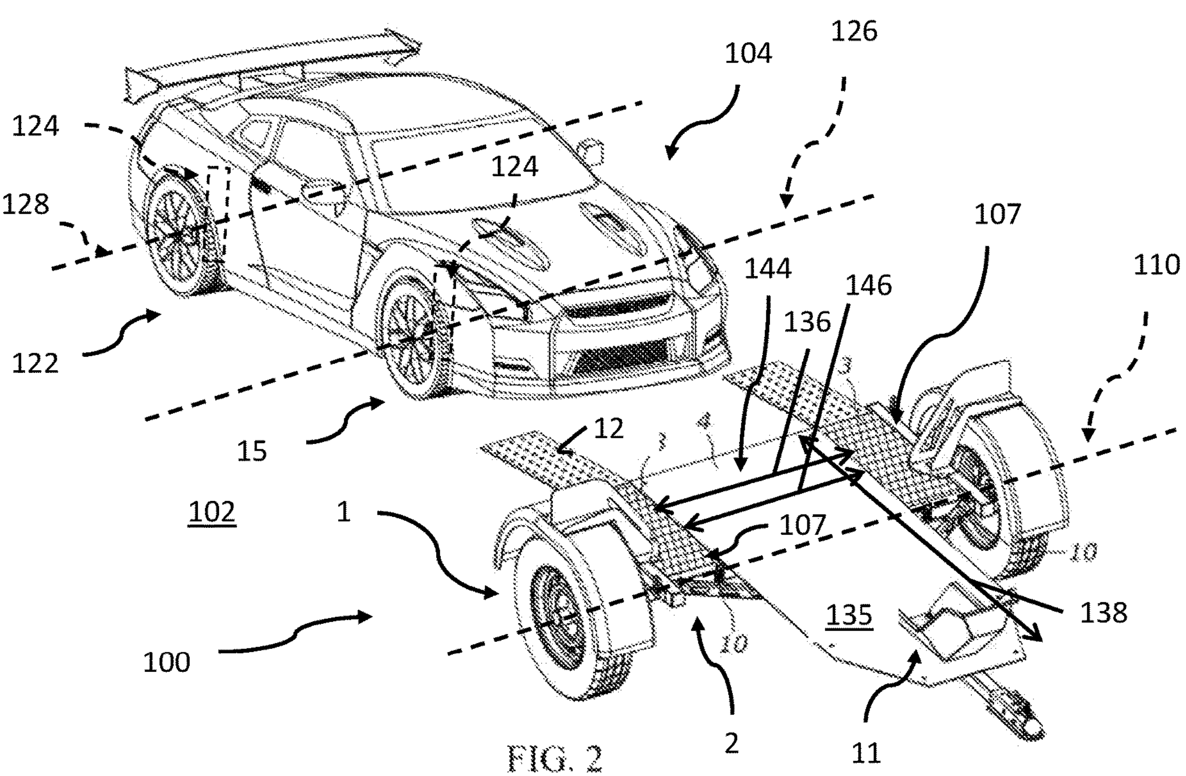
FIG. 2 depicts a perspective view of the tow dolly that shows the tow dolly ready to load an vehicle, such as an automobile, with the loading ramps positioned for use.

FIG. 2 depicts a perspective view of the preferred embodiment that shows dolly 100 ready to load towed vehicle 104 with load ramps 12 positioned for use with a four wheeled vehicle, such as an automobile. Dolly chassis 2 includes a front end 112 configured to couple to tow vehicle 106 with a ball hitch or other suitable coupling and a rear end 114. Load ramps 12 are attached to rear end 114 of dolly chassis 2. Load ramps 12 are positioned so they are centered in front of front/forward vehicle wheels 15 of towed vehicle 104, allowing an automobile to drive up ramps 12 to automobile wheel support area 3. Towed vehicle 104 includes a vehicle chassis 120, forward vehicle wheels 15, rear/rearward vehicle wheels 122, a vehicle suspension 124, such as shocks, coil springs, struts, etc., that may compliantly support vehicle chassis 120 on forward and rearward wheels 15, 122.

Figure 3:
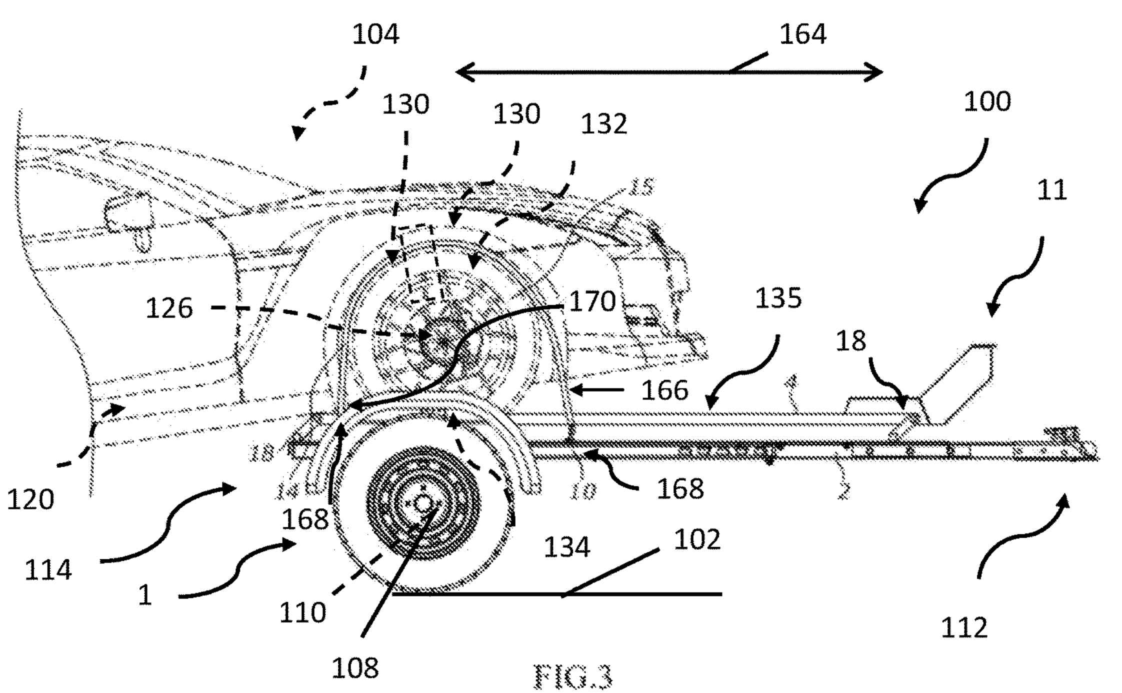
FIG. 3 depicts a side view of the tow dolly with the automobile loaded and ready for transport/towing.

FIG. 3 depicts a side view of the preferred embodiment that shows dolly 100 with towed vehicle 104 loaded and ramps 12 removed and ready for transport. Automobile wheels 15 are positioned on automobile wheel support areas 3 and secured with vehicle wheel ratchet straps/vehicle tie downs 14 that are attached to frame/chassis 2 at tie down locations. Motorcycle carrier/platform 4 is shown in an unloaded/higher position and a torsion platform suspension 18 of dolly 100 is shown in an uncompressed state.

When the front end of towed vehicle 104 is supported by dolly 100 and is in a condition/state ready to be towed, the weight of towed vehicle 104 is preferably applied to dolly 100 forward of dolly wheel axis of rotation 110 so that the vehicle weight is properly distributed between dolly wheels 1 and tow vehicle 106. Preferably chassis 2 is level with ground 102 and applying weight to tow vehicle 106 within the rated tongue weight of tow vehicle 106. Chassis 2 should not apply a lifting force to tow vehicle 106.

Forward vehicle wheels 15 cooperate to define a forward wheel axis of rotation 126 that is forward of dolly wheel axis of rotation 110 when towed vehicle 104 is loaded and ready to tow. Rearward vehicle wheels 122 cooperate to define a rearward wheel axis of rotation 128 that is rearward of dolly wheel axis of rotation 110 when towed vehicle 104 is loaded and ready to tow. According to the preferred embodiment of the present disclosure, motorcycle 17 is not loaded on dolly 100 and spaced apart from dolly 100 when towed vehicle 104 is loaded on dolly 100.

When towed vehicle 104 is being towed by tow vehicle 106, forward vehicle wheels 15 are not rotating relative to dolly chassis 2 or any other component of dolly 100 and rearward vehicle wheels 122 are in contact with the road/ground 102 and rotating relative to dolly chassis 2 and the other components of dolly 100. Tires 130 of forward vehicle wheels 15 that are coupled to wheel hubs 132 have lowermost surfaces 134 that are supported on vehicle wheel support surfaces 3. Lowermost surfaces are lower than motorcycle wheel support surface 135 of dolly platform 4 because dolly platform 4 is not under the weight of towed vehicle 104 or motorcycle 17 as discussed below. Pair of vehicle wheel support surfaces 3 support laterally spaced apart forward wheels 15 of towed vehicle 104. Pair of vehicle wheel support surfaces 3 are spaced apart by about a wheel distance 136 between forward wheels 15. Dolly platform 4 has a length 138 sufficient to support forward and rearward motorcycle wheels 140, 142 and a portion 144 positioned between pair of towed vehicle support surfaces 3. Portion 144 has a maximum width 146 perpendicular to length 138 that is less than wheel distance 136 to allow forward vehicle wheels 15 to straddle dolly platform 4 and not compress platform suspension 18.

Figures 4, 5:
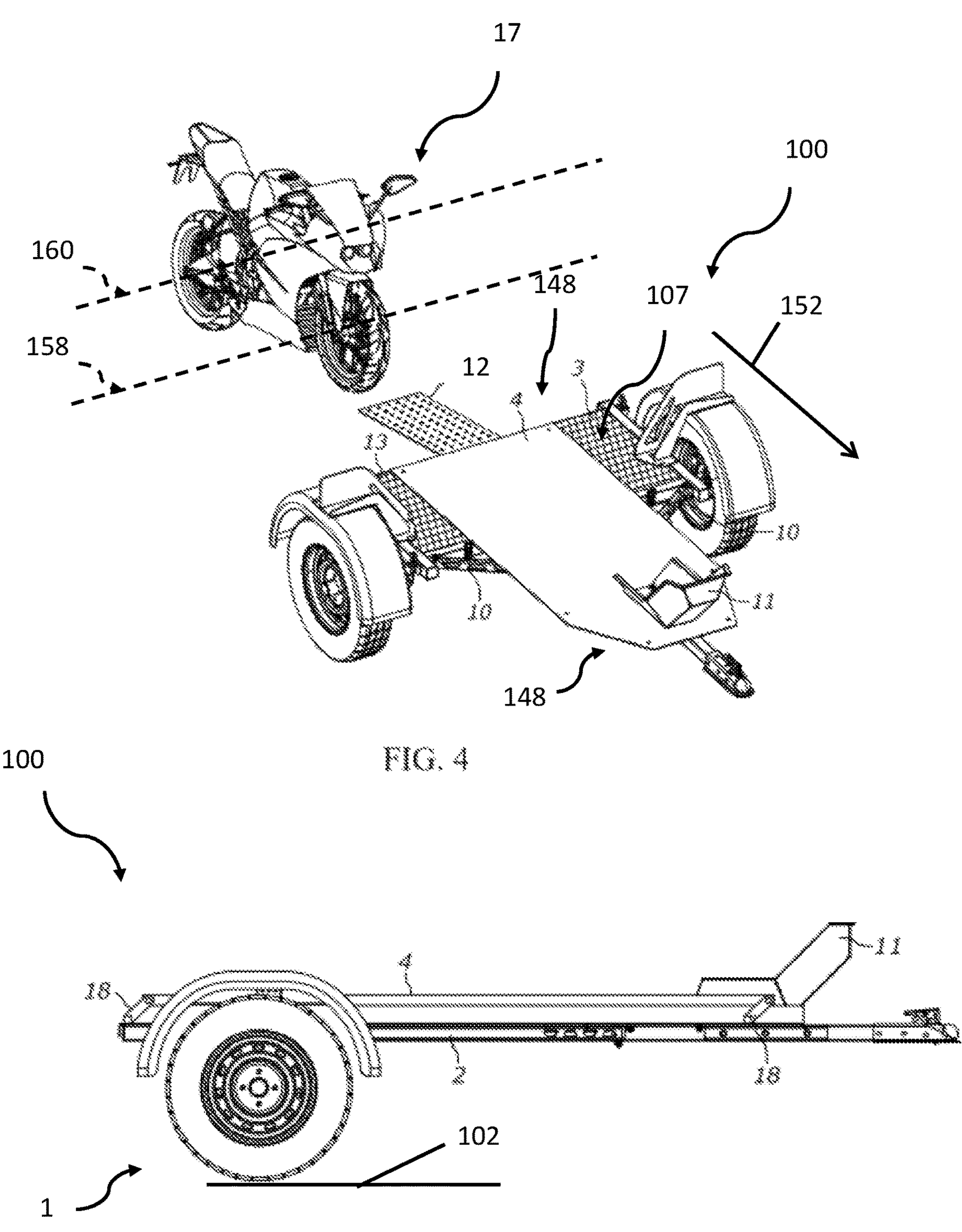
FIG. 4 depicts a perspective view of the tow dolly ready to load a motorcycle with the loading ramps positioned for use.
FIG. 5 depicts a side view of the tow dolly unloaded and a motorcycle carrier/platform in an uncompressed position.

FIG. 4 depicts a perspective view of the preferred embodiment dolly 100 ready to load motorcycle 17 with one load ramp 12 positioned for use along a center of dolly 100 and attached to rear end 114 of dolly chassis 2. Load ramp 12 is positioned toward a rear end 148 of motorcycle carrier/platform 4, allowing motorcycle 17 to ride up load ramp 12 onto motorcycle carrier/platform 4 and position motorcycle front wheel 140 into wheel chock 11 positioned on front end 150 of motorcycle platform 4. Motorcycle wheel chock 11 is positioned to receive forward motorcycle wheel 140 when motorcycle 17 is positioned in a direction 152 of travel of dolly 100.

Figure 6:
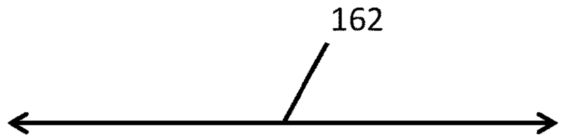
FIG. 6 depicts a side view of the tow dolly with a motorcycle loaded and the motorcycle carrier/platform in a compressed position.
Figure 6:
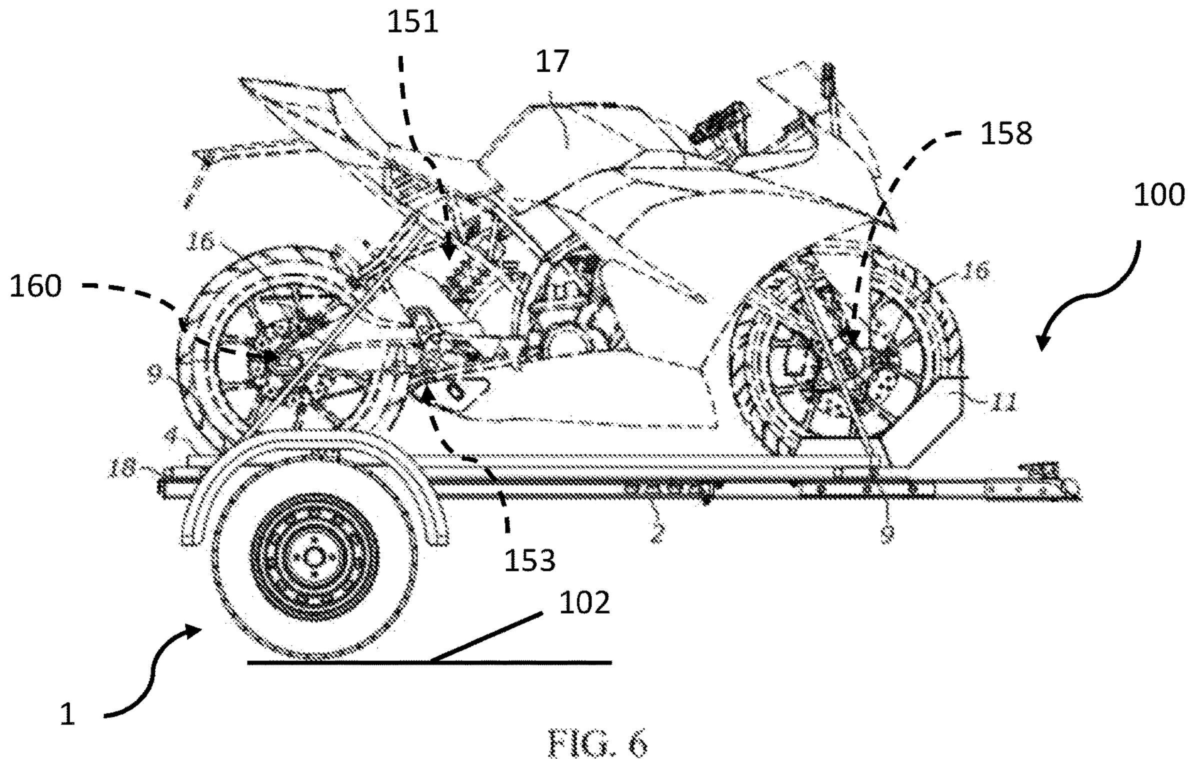

FIG. 5 depicts a side view of preferred embodiment dolly 100 that shows dolly 100 unloaded with motorcycle carrier/platform 4 in the unloaded/higher position since torsion platform suspension 18 is not compressed by the weight of motorcycle 17. FIG. 6 depicts a side view of preferred embodiment dolly 100 with motorcycle 17 loaded, load ramps removed and is in a condition/state ready to be towed. According to the preferred embodiment of the present disclosure, towed vehicle 104 is not loaded on dolly 100 and spaced apart from dolly 100 when motorcycle 17 is loaded on dolly 100.

Motorcycle 17 is secured to motorcycle carrier/platform 4 via wheel chock 11 and motorcycle tie downs/straps 16 that are used to secure motorcycle 17 to motorcycle carrier/platform 4 via tie down locations 9 to keep motorcycle 17 upright during transportation. When tied down to dolly platform 4, at least a portion of motorcycle suspension 151 is compressed between motorcycle chassis 153 and motorcycle wheels 140, 142. Platform suspension 18 at least partially offsets this compression so that motorcycle 17 can be more rigidly secured to dolly platform 4 yet motorcycle 17 is still at least partially protected by shocks from dolly 100 striking bumps, holes, objects, etc. on road/ground 102.

Motorcycle carrier/platform 4 is shown in its loaded/lower position and torsion platform suspension 18 is shown in its compressed position, a distance closer to dolly chassis 2 than if platform suspension 18 were not compressed, under the weight of motorcycle 17 with forward and rear spring 154, 156 compressed. In one embodiment, dolly chassis 2 may be lengthened to facilitate towing of tow vehicle 104 and motorcycle 17 at the same time so that forward vehicle wheels 15 are positioned behind dolly wheels 1, rather than forward of dolly wheels 1, to allow balancing of the weight of tow vehicle 104 and motorcycle 17 over dolly wheels 1 while still maintaining an appropriate load on tow vehicle 106.

Forward motorcycle wheel 140 is configured to rotates about a forward motorcycle wheel axis of rotation 158 and rearward motorcycle wheel 142 rotates about a reward motorcycle wheel axis of rotation 160. Forward and rearward axes of rotation 158, 160 cooperate to define a distance 162 therebetween. When towed vehicle 104 is loaded on dolly 100 and ready to be towed, forward wheel axis of rotation 126 and wheel chock 11 (where forward motorcycle wheel axis of rotation 158 is located when motorcycle 17 is loaded) cooperate to define a distance 164 (see FIG. 3) that is less than distance 162.

When towed vehicle 104 is secured to dolly 100, vehicle tie downs 14 having a forward portion 166 that is attached to dolly chassis 2 at a forward location 168 and a rearward portion 170 that is attached to dolly chassis 2 at a first rearward location 172. When motorcycle 17 is secured to dolly 100, motorcycle tie down 16 is attached to dolly platform 4 at a second rearward location 9. First and second rearward locations 172, 9 are substantially rearward of forward location 168 and about the same rearward distance from forward location 168.

Figure 7:
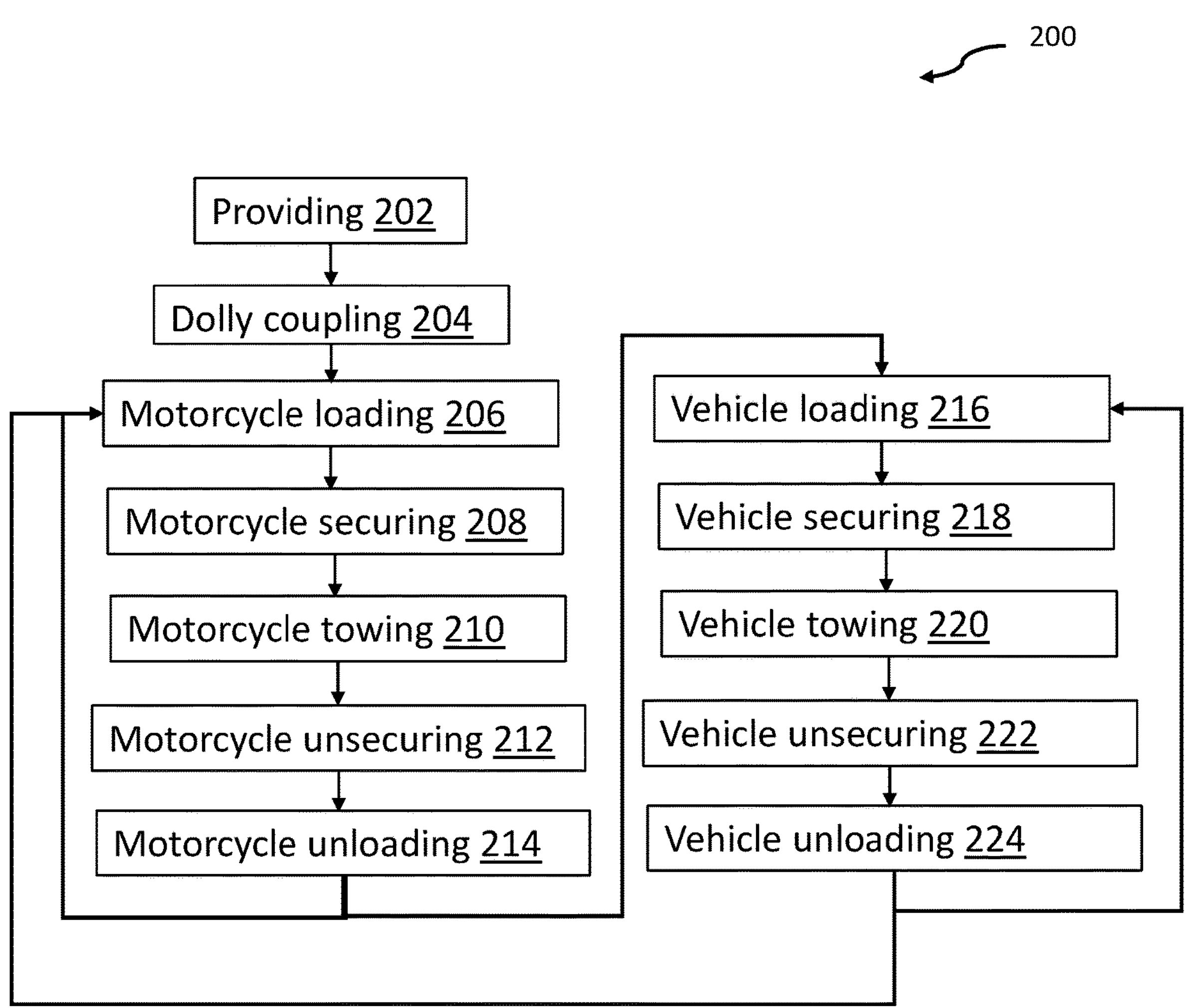
FIG. 7 depicts a method of towing the vehicle and motorcycle with the tow dolly.

According to the present disclosure, a method 200 of towing towed vehicle 104 and motorcycle 17 with dolly 100 and tow vehicle 106 is provided as shown in FIG. 7. This method comprises a providing step 202 of providing tow vehicle 106, dolly, towed vehicle 104, and motorcycle 17. Dolly 100 may include plurality of wheels 1 cooperating to define dolly wheel axis of rotation 110. Method 200 further includes a coupling step 204 of coupling front end 112 of dolly 100 to tow vehicle 106, a loading step 206 of loading motorcycle 17 on dolly 100, a securing step 208 of securing motorcycle 17 to dolly 100, a towing step 210 of towing motorcycle 17 and dolly 100 with tow vehicle 106, an unsecuring step 212 of unsecuring motorcycle 17 from dolly 100, an unloading step 214 of unloading motorcycle 17 from dolly 100, another loading step 216 of loading towed vehicle 104 on dolly 100, another securing step 218 of securing towed vehicle 104 to dolly 100. Axis of rotation 126 of towed vehicle wheels 15 may be positioned forward of dolly wheel axis of rotation 110. Method 200 further includes a towing step 220 of towing towed vehicle 104 and dolly 100 with tow vehicle 106. Plurality of towed vehicle wheels 15 may be supported by dolly 100 and second plurality of wheels 122 of towed vehicle 104 may be supported by ground 102. Method 200 further includes another unsecuring step 222 of unsecuring towed vehicle 104 from dolly 100 and another unloading step 224 of unloading towed vehicle 104 from dolly 100. The order of steps in method 200 may be different than described elsewhere herein. For example, towed vehicle 104 may be towed before motorcycle 17; motorcycle 17 may be repeated loaded, towed, and unloaded without towed vehicle 104 being towed; towed vehicle 104 may be repeated loaded, towed, and unloaded without motorcycle 17 being towed, etc.

What is claimed is:

1. A dolly, vehicle, and motorcycle assembly comprising,
a dolly including
a dolly chassis having a front end configured to couple to a tow vehicle and a rear end spaced apart from the front end and
a plurality of dolly wheels supporting the dolly chassis, the plurality of dolly wheels cooperating to define a dolly wheel axis of rotation about which the plurality of dolly wheels rotate,
a vehicle including
a vehicle chassis,
a forward plurality of vehicle wheels supporting the vehicle chassis,
a rearward plurality of vehicle wheels supporting the vehicle chassis,
a forward vehicle wheel axis of rotation about which the forward plurality of vehicle wheels rotate, and
a rearward vehicle wheel axis of rotation about which the rearward plurality of vehicle wheels rotate, and
a motorcycle including
a motorcycle chassis and
a plurality of motorcycle wheels supporting the motorcycle chassis, a forward motorcycle wheel axis of rotation about which a forward motorcycle wheel rotates and a rearward motorcycle wheel axis of rotation about which a rearward motorcycle wheel rotates,
the dolly, vehicle, and motorcycle assembly having a first state with the vehicle being supported by the dolly with the forward vehicle wheel axis of rotation being positioned forward of the dolly wheel axis of rotation, the forward plurality of wheels being stationary relative to the dolly chassis, the rearward plurality of wheels being supported by the ground, the rearward plurality of wheels rotating relative to the chassis, and the motorcycle being spaced apart from the dolly, and
the dolly, vehicle, and motorcycle assembly having a second state with the motorcycle being supported by the dolly with the forward motorcycle wheel axis of rotation being positioned forward of the dolly wheel axis of rotation, the rearward motorcycle wheel axis of rotation being positioned rearward of the dolly wheel axis of rotation, and the vehicle being spaced apart from the dolly.

2. The assembly of claim 1, wherein the dolly further comprises a motorcycle wheel chock supported by the dolly chassis.

3. The assembly of claim 1, wherein the dolly further comprises a platform supporting the motorcycle when the dolly, vehicle, and motorcycle assembly is in the second state, a platform suspension compliantly supporting the platform on the dolly chassis, and an axle rigidly supporting the dolly chassis.

4. The assembly of claim 3, wherein the platform is spaced apart from the dolly chassis by a first distance when the dolly, vehicle, and motorcycle assembly is in the first state, the platform is spaced apart from the dolly chassis by a second distance when the dolly, vehicle, and motorcycle assembly is in the second state, the second distance being greater than the first distance.

5. The assembly of claim 1, further comprising at least one motorcycle tie down and a plurality of vehicle tie downs, the at least one motorcycle tie down including a rearward tie down securing the rearward wheel of the motorcycle to a first location on the dolly when the dolly, vehicle, and motorcycle assembly is in the second state, the plurality of vehicle tie downs having a forward portion securing the forward wheels of the vehicle to a second location on the dolly and a rearward portion securing the forward wheels of the vehicle to a third location on the dolly when the dolly, vehicle, and motorcycle assembly is in the first state, the first location being rearward of the second location.

6. The assembly of claim 5, wherein the second location is substantially forward of the third location and the first location is at about the same rearward distance from the second location as the third location.

7. The assembly of claim 5, wherein the vehicle includes a vehicle suspension supporting the vehicle chassis relative to the forward plurality of vehicle wheels and the rearward plurality of vehicle wheels, the plurality of vehicle tie downs avoid impacting the operation of the vehicle suspension, the motorcycle includes a motorcycle suspension supporting the motorcycle chassis relative to the forward and rearward motorcycle wheels, and the at least one motorcycle tie down compresses the motorcycle suspension when the dolly, vehicle, and motorcycle assembly are in the second state.

8. The assembly of claim 7, wherein the dolly further comprises a platform supporting the motorcycle when the dolly, vehicle, and motorcycle assembly is in the second state and a platform suspension compliantly supporting the platform on the dolly chassis to offset the compression of the motorcycle suspension.

9. A dolly and vehicle assembly comprising, a dolly including a dolly chassis having a front end configured to couple to a tow vehicle and a rear end spaced apart from the front end, a plurality of dolly wheels supporting the dolly chassis, the plurality of dolly wheels cooperating to define a dolly wheel axis of rotation about which the plurality of dolly wheels rotate, a motorcycle wheel chock supported by the dolly chassis, and a vehicle including a vehicle chassis and a plurality of vehicle wheels supporting the vehicle chassis, the plurality of vehicle wheels including a forward plurality of vehicle wheels and a rearward plurality of vehicle wheels, the forward plurality of vehicle wheels cooperating to define a forward vehicle wheel axis of rotation about which the forward plurality of vehicle wheels rotate and the rearward plurality of vehicle wheels cooperating to define a rearward vehicle wheel axis of rotation about which the rearward plurality of vehicle wheels rotate, the forward plurality of vehicle wheels being supported by the dolly with the forward vehicle wheel axis of rotation forward of the dolly wheel axis of rotation, and the rearward plurality of wheels being supported by the ground.

10. The assembly of claim 9, wherein the motorcycle wheel chock is positioned to receive a motorcycle wheel of a motorcycle positioned in a direction of travel of the dolly.

11. The assembly of claim 9, wherein the dolly further includes a platform supported by the dolly chassis, the platform having a motorcycle support surface, each of the plurality of wheels defining the vehicle wheel axis of rotation having a wheel hub and a tire coupled to the wheel hub, the tires having a lowermost surface being positioned lower than the motorcycle support surface.

12. The assembly of claim 11, wherein the dolly further includes a platform suspension supporting the platform and supported by the dolly chassis, the platform supportable by the suspension between a raised position to a lowered position relative to the dolly chassis.

13. A dolly, vehicle, and motorcycle assembly comprising, the dolly and vehicle assembly of claim 9 and a motorcycle including a motorcycle chassis and a plurality of motorcycle wheels supporting the motorcycle chassis, a first motorcycle wheel axis of rotation about which a first motorcycle wheel rotates and a second motorcycle wheel axis of rotation about which a second motorcycle wheel rotates, the first and second motorcycle wheel axes of rotation cooperating to define a first distance, the vehicle wheel axis of rotation and a rear end of the wheel chock cooperating to define a second distance that is less than the first distance.

14. A dolly and motorcycle assembly comprising, a dolly including a dolly chassis having a front end configured to couple to a tow vehicle and a rear end spaced apart from the front end, a plurality of dolly wheels supporting the dolly chassis, the plurality of dolly wheels cooperating to define a dolly wheel axis of rotation about which the plurality of dolly wheels rotate, a platform, and a platform suspension supporting the platform and supported by the dolly chassis, and a motorcycle supported by the platform and including a motorcycle chassis and a plurality of motorcycle wheels supporting the motorcycle chassis, wherein the dolly chassis includes a pair of towed vehicle wheel support surfaces configured to support laterally spaced apart wheels of a towed vehicle, the pair of towed vehicle wheel support surfaces are spaced apart by a first distance, the platform has a length sufficient to support the plurality of motorcycle wheels and a portion positioned between the pair of towed vehicle support surfaces, the portion has a maximum width perpendicular to the length, the maximum width of the portion is less than the first distance.

15. The assembly of claim 14, wherein the platform is moveable between a raised position to a lowered position relative to the dolly chassis with the platform suspension biasing the platform toward the raised position.

16. The assembly of claim 14, wherein the platform suspension cushions the motorcycle during transport of the motorcycle.

17. The assembly of claim 14, wherein the dolly further includes a wheel chock supported by the platform.

18. The assembly claim of 14, wherein the platform includes a front end and a rear end and the platform suspension includes a front spring supporting the front end of the platform on the chassis and a rear spring supporting the rear end of the platform.

19. The assembly of claim 14, further comprising at least one motorcycle tie down and a plurality of vehicle tie downs, the at least one motorcycle tie down including a rearward tie down securing a rearward wheel of the motorcycle to the dolly, the motorcycle includes a motorcycle suspension supporting the motorcycle chassis relative to the plurality of motorcycle wheels, and the at least one motorcycle tie down compresses the motorcycle suspension, and the platform offsets the compression of the motorcycle suspension.

* * * * *